Oct. 19, 1965

A. B. ADLER 3,212,788

COLLAPSIBLE CARRIER

Filed April 2, 1963

INVENTOR

Aliza B. Adler

BY Irons, Birch, Swindler & McKie
ATTORNEYS

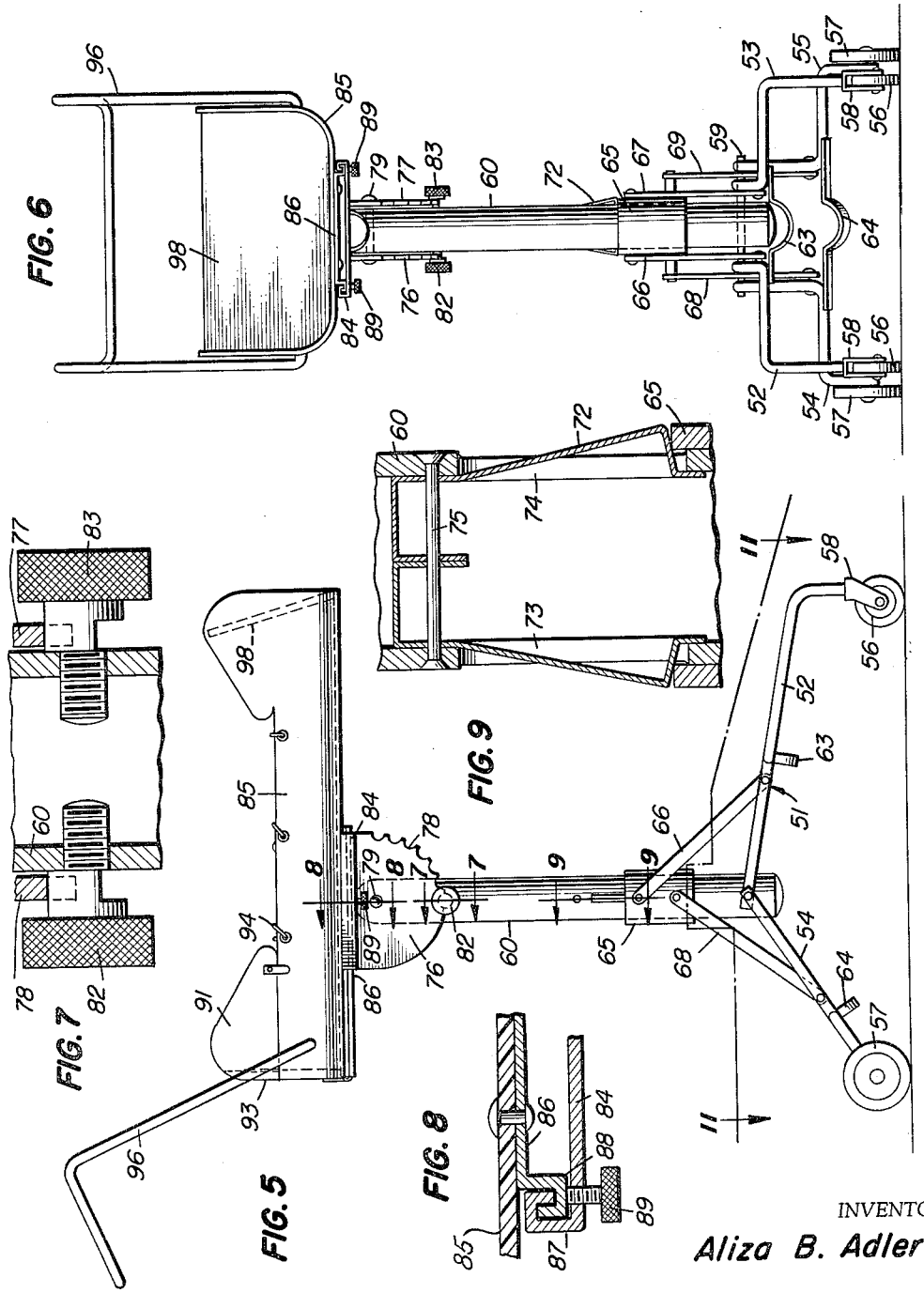

Oct. 19, 1965    A. B. ADLER    3,212,788
COLLAPSIBLE CARRIER
Filed April 2, 1963    6 Sheets-Sheet 3
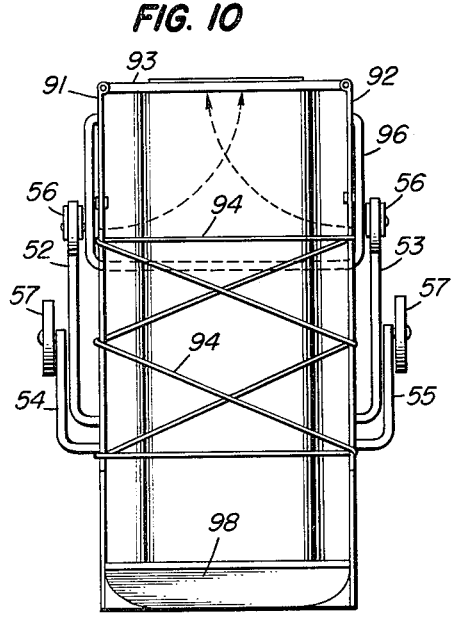
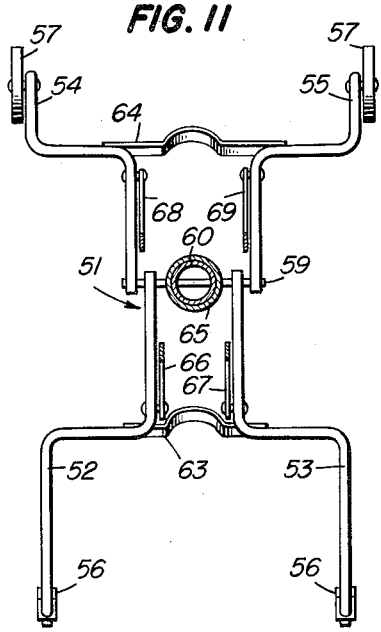
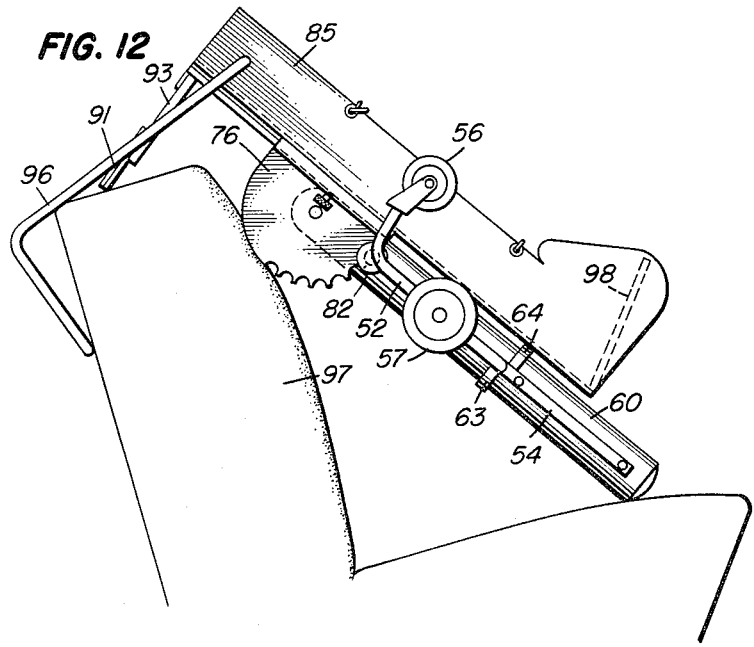
INVENTOR
Aliza B. Adler
BY Irons, Birch, Swindler & McKie
ATTORNEYS

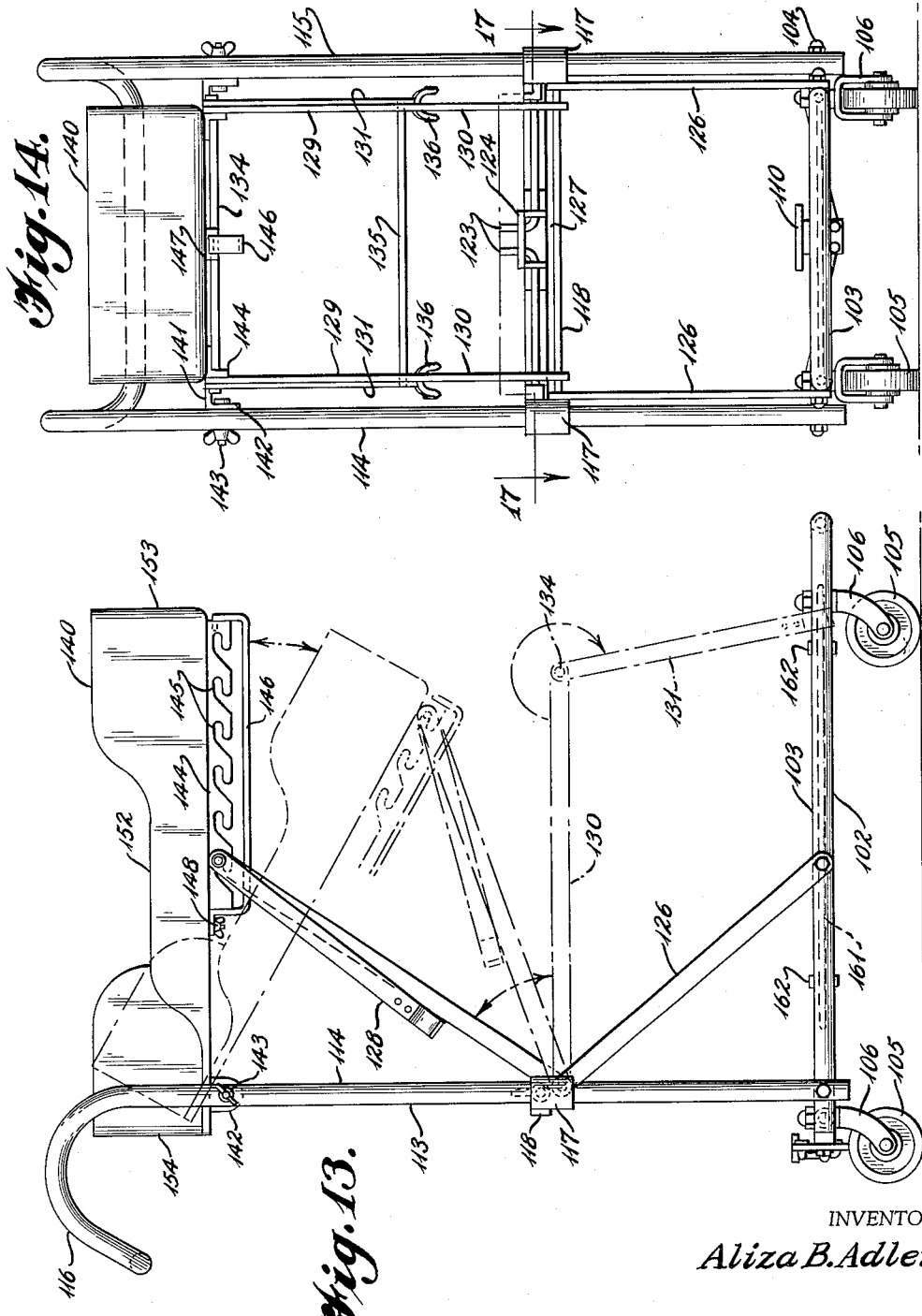

Oct. 19, 1965
A. B. ADLER
3,212,788
COLLAPSIBLE CARRIER
Filed April 2, 1963
6 Sheets-Sheet 5
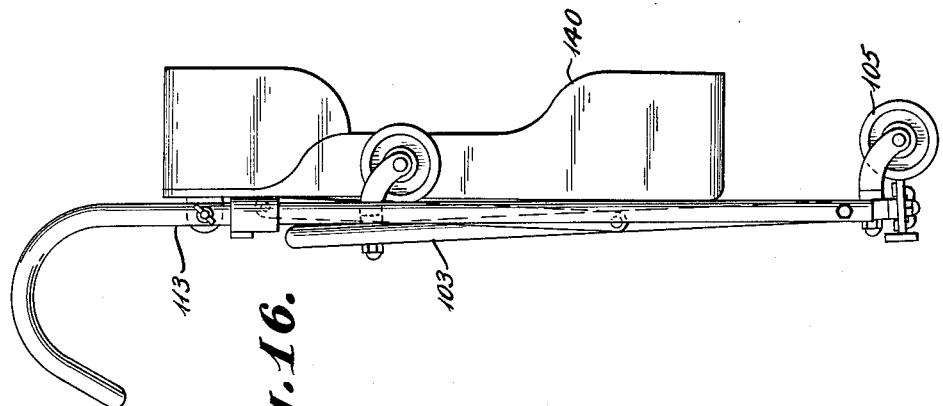
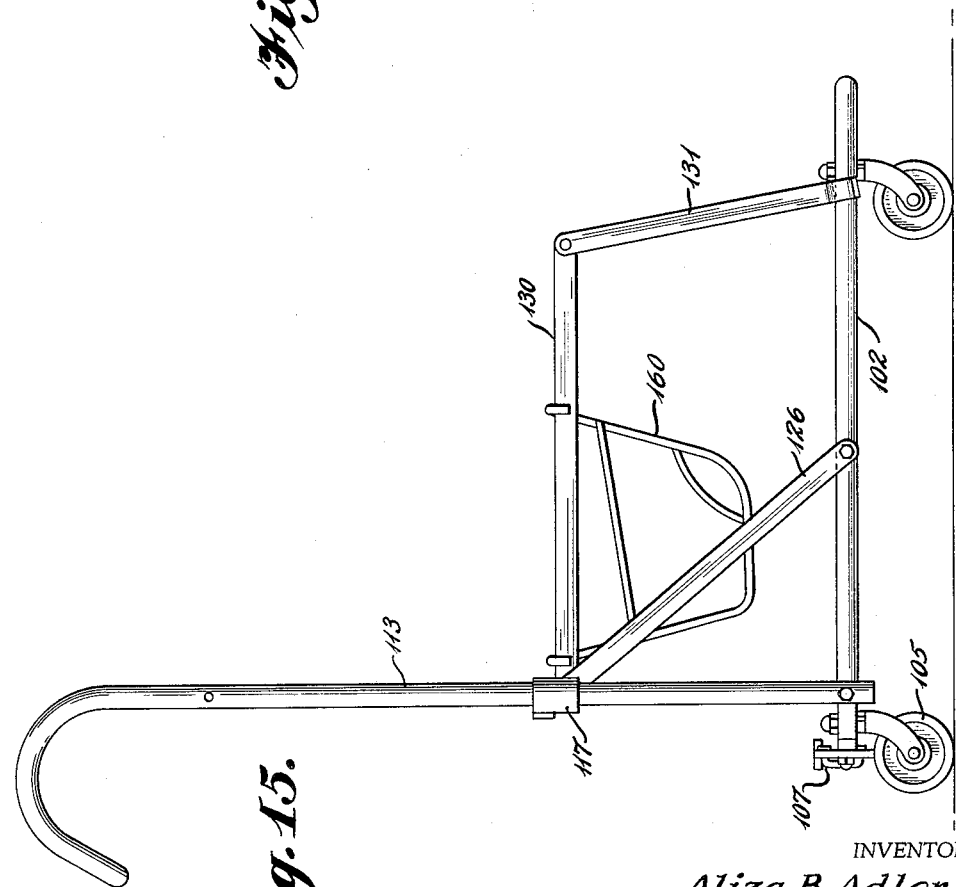
INVENTOR
*Aliza B. Adler*
BY *Irons, Birch, Swindler & McKie*
ATTORNEYS Oct. 19, 1965

A. B. ADLER 3,212,788

COLLAPSIBLE CARRIER

Filed April 2, 1963

INVENTOR
Aliza B. Adler

BY Irons, Birch, Swindler & McKie
ATTORNEYS

United States Patent Office 3,212,788
Patented Oct. 19, 1965

1

3,212,788
COLLAPSIBLE CARRIER
Aliza B. Adler, 554 W. Davis Blvd., Tampa, Fla.
Filed Apr. 2, 1963, Ser. No. 270,511
4 Claims. (Cl. 280—36)

This invention relates to a collapsible carrier and more particularly to a mobile collapsible carrier adapted for use in carrying infants which is readily convertible to a stroller.

This application is a continuation in part of my co-pending application Serial No. 212,413 filed July 25, 1962, now abandoned.

There are many occasions where it is desirable to have a light, mobile carrier for transporting infants from place to place or room to room such as around the home or in a hospital. Such carriers should provide a safe means of transporting infants to prevent any unnecessary accidents. In transporting the infants, it is advantageous to have a carrier with a basket which may be tilted to a number of angular positions for convenience in caring for the infant. For example, a relatively new born infant should be carried in a horizontal position whereas it is often desirable to carry an older infant in more of a vertical or upright position.

Further, it is often necessary to carry the infant in the carrier when riding in an automobile or other means of transportation. On such occasions, it is desirable to fold the carrier into a compact unit while still being able to utilize the basket of the carrier to hold the infant.

Although mobile infant carriers are highly useful while an infant is quite young, it does not take an infant very long to grow out of such a carrier to the point where a stroller is needed. Thus, the useful life of an ordinary infant carrier is of relatively short duration causing many people to hesitate to buy them. There has long been a need for a simple, economical infant carrier which may be converted into a stroller, thus prolonging to a significant degree the usefulness of such a carrier.

While prior collapsible carriers have been devised, none has proved completely satisfactory. Some such prior art carriers do not provide a means for safely securing an infant in the basket or are not provided with angularly adjustable baskets. Other prior carriers do not permit use of the basket when the carrier is in a collapsed position. Still other available collapsible carriers are heavy, complex and relatively difficult to handle or are not convertible to baby strollers.

To overcome the disadvantages of prior art carriers, it is an object of this invention to provide an improved collapsible carrier having a basket which may be tilted to any one of a plurality of predetermined angular positions while the carrier is in an erect position.

Another object of the invention is to provide a mobile collapsible infant carrier which may be readily converted into an infant stroller.

A further object of the invention is to provide an improved collapsible carrier particularly adapted for carrying infants whereby the infant may be securely held in the carrier basket at all times.

A still further object of the invention is to provide an improved collapsible carrier which may be easily and readily collapsed into a compact unit.

Another further object of the invention is to provide an improved collapsible carrier whereby the basket may be used while the carrier is in a collapsed position.

Still another object of the invention is to provide such an improved collapsible carrier which is mobile, light, strong, and of simple construction.

A further object of the invention is to provide an improved mobile collapsible infant carrier which includes an infant holding basket having a removable end wall to accommodate various sized infants.

Broadly, the invention embraces a collapsible carrier comprising a supporting carriage, an upstanding frame member mounted on said carriage, a vertically adjustable link connecting said carriage and said frame member, a basket pivotally connected to said frame member, and means for adjusting said basket to a plurality of predetermined angular positions whereby said basket may be locked in any one of said positions. In addition, one embodiment of of the carrier of the present invention also includes an adjustable brace movable to a plurality of positions and connected at one end to said frame member, said brace having a first position engaging and supporting said basket, said brace also having a second position forming support means for an auxiliary infant seat, permitting said carrier to be converted into an infant stroller upon removal of said basket and subsequent attachment of said seat.

The invention having been generally described, certain specific embodiments will now be set forth in detail with reference to the accompanying drawings in which:

FIGURE 5 is a side elevation view of a modified collapsible carrier according to the invention;

FIGURE 6 is a front elevation view of the carrier of FIGURE 5;

FIGURE 7 is an enlarged sectional view taken along line 7—7 of FIGURE 5 showing the basket locking device;

FIGURE 8 is an enlarged sectional view taken along line 8—8 of FIGURE 5 showing the connection between the basket and the locking plate;

FIGURE 9 is an enlarged sectional view taken along line 9—9 of FIGURE 5 showing the bracket locking mechanism;

FIGURE 10 is a top plan view of the carrier of FIGURE 5 in a collapsed position;

FIGURE 11 is a vertical section taken along line 11—11 of FIGURE 5; and

FIGURE 12 is a side view of the carrier of FIGURE 5 in a collapsed position engaging a seat.

FIGURE 13 is a side elevation view of still another modified collapsible carrier according to the invention;

FIGURE 14 is a front elevation view of the carrier of FIGURE 13;

FIGURE 15 is a side elevation view showing the carrier of FIGURE 13 after it has been converted into a baby stroller;

FIGURE 16 is a side elevation view showing the carrier of FIGURE 13 in a collapsed position;

Figure 1:
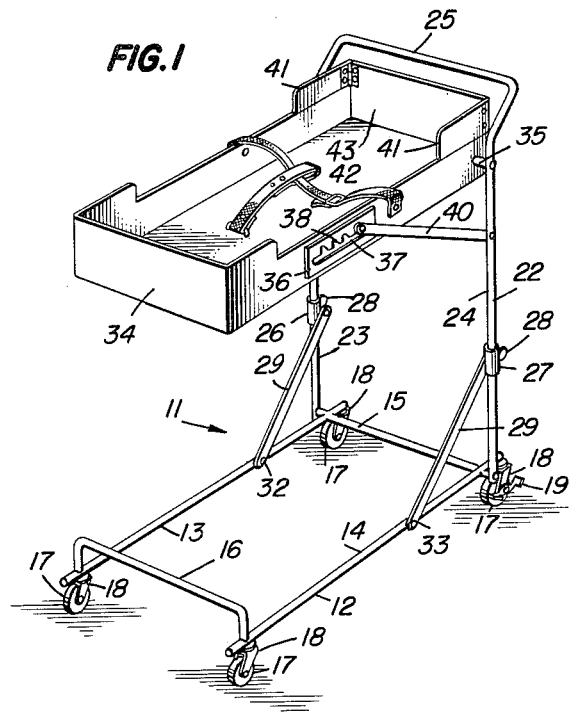
FIGURE 1 is an isometric view of a collapsible carrier constructed according to the principles of the present invention.

Illustrated in FIGURES 1–4 is a collapsible carrier indicated generally by the numeral 11. Such carrier includes a generally rectangular supporting carriage 12 having a pair of spaced, elongated, tubular members 13 and 14 connected at one end by a lateral, tubular member 15 and at the opposite end by an inverted U-shaped, lateral, tubular member 16. The carriage 12 is supported by wheels 17 mounted in swiveled casters 18 on each corner thereof. The two rear wheels 17 are each provided with a locking device 19 to prevent them from swiveling, if desired.

Pivotally mounted on the ends of lateral member 15 is a single, inverted U-shaped upstanding frame member 22 comprised of a pair of legs 23 and 24 connected at the top by a lateral handle member 25. Legs 23 and 24 may be constructed so as to be either of the telescoping type or the rigid type. If legs 23 and 24 are of the telescoping type, they would of course be vertically adjustable. A pair of vertically movable brackets 26 and 27 are mounted on the legs 23 and 24 for connection with a pair of links 29 pivoted at 32 and 33 to the spaced elongated carriage members 13 and 14, respectively. The brackets 26 and 27 are provided with hand screws 28 to lock them in position on the legs 23 and 24.

Figure 4:
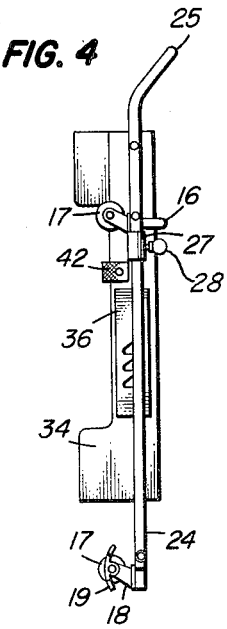
FIGURE 4 is a side elevation view showing such carrier in a collapsed position.

Handle member 25 is curved backwardly for convenience in handling the carrier 11. The handle 25 may be constructed with more or less of a curve than that shown in the drawings to increase the utility of the handle. For example, it would be desirable to construct the handle 25 with a greater curve so that it can be adapted to engage a support such as a car seat when the carrier is in a collapsed position as shown in FIGURE 4. Although not shown in the drawings, handle 25 also may be telescopically connected to legs 23 and 24 for greater ease in handling the carrier 11.

Figure 2:
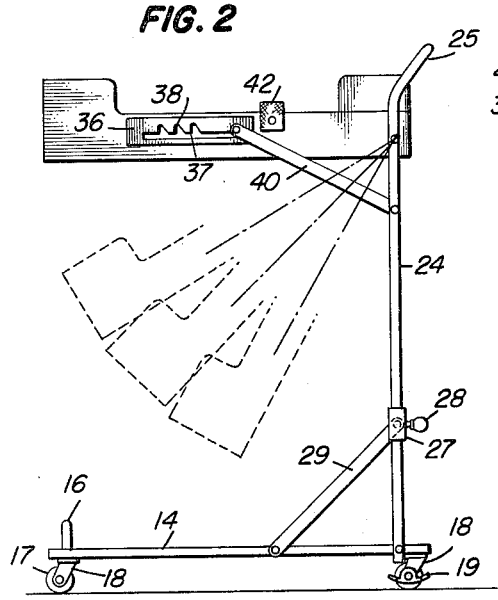
FIGURE 2 is a side elevation view of such carrier with the dotted lines illustrating a plurality of fixed positions to which the basket may be angularly tilted.
Figure 3:
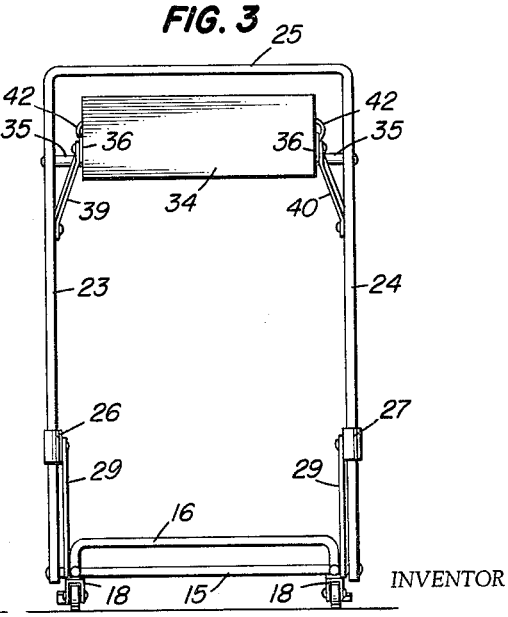
FIGURE 3 is a front elevation view of such carrier.

A basket 34 is pivotally connected at one end to the legs 23 and 24 of frame member 22 by a pair of pins 35 protruding from opposite sides of the basket. A pair of plates 36 provided with slots 37 and detents 38 are fixedly mounted on opposite sides of basket 34 to receive the ends of a pair of cooperating locking members or braces 39 and 40 pivotally connected to the legs 23 and 24. The braces 39 and 40 centrally support the basket 34. By sliding the ends of the braces 39 and 40 in the slots 37 to one of the detents 38, the basket may be angularly tilted to any one of a plurality of predetermined positions ranging from horizontal to vertical corresponding with the detents 38 as shown in FIGURE 2.

The basket 34 is provided with a hinged rear end wall 43 which may be folded back or entirely removed if desired. Hinged side flaps 41, which may be folded inwardly, additionally are provided on the ends of rear wall 43. Straps or belts 42 fastened to the sides and bottom of the basket securely hold the contents of the basket therein. When it is desired to utilize the basket for holding an infant, a horizontal and a vertical strap preferably are provided as shown in FIGURE 1. Although the straps 42 are shown as attached to the bottom and on the outside of side walls of the basket 34, they may be attached to the inside of the side and end walls in various other positions if desired. Also, the interior of the basket may be lined with a padded plastic or other lining which may be removed or replaced when soiled.

The entire carrier is adapted to be folded into a collapsed position as shown in FIGURE 4. To collapse the carrier, the hand screws 28 on brackets 26 and 27 are loosened to permit the brackets to slide freely on the legs 23 and 24. The carriage is then folded upwardly until it is in a parallel relation with the upstanding frame member 22. The basket 34 is thereafter tilted downwardly to a vertical position by sliding the ends of links 39 and 40 to the ends of slots 37. When the carrier is in a collapsed position, the basket nestles in the U-shaped lateral carriage member 16.

The position of the basket 34 when the carrier is collapsed is such that it is still readily accessible for use. It may be used, for example, to carry an infant when in this position.

A modified collapsible carrier according to the invention is shown in FIGURES 5–12. The carrier includes a carriage 51 comprised of a pair of front legs 52 and 53 and a pair of rear legs 54 and 55, supported on a pair of front wheels 56 and a pair of rear wheels 57. The front wheels 56 are mounted in swiveled casters 58 secured to the front legs 52 and 53. The pairs of legs of the carriage are angularly bent so as to be relatively close together at the center of the carriage and farther apart at the ends of the carriage, thus giving stability to the carriage.

Each pair of legs is pivotally connected by a common pin 59 to the lower end of an upstanding tubular frame member 60. The front legs 52 and 53 are further joined midway of their length by a cross brace 63 having a bent center portion which is adapted to fit around the tubular frame member 60 when the legs are folded upwardly into parallel relation with the member 60. Rear legs 54 and 55 are connected midway of their length by a similar cross brace 64.

Mounted on the upstanding frame member 60 is a vertically movable bracket 65 connected to the front legs 52 and 53 by a first pair of pivoted links 66 and 67 and to the rear legs 54 and 55 by a second pair of pivoted links 68 and 69, respectively. The bracket 65 may be locked in its lower position by a leaf spring locking member 72 extending through slots 73 and 74 on opposite sides of frame member 60. As shown in detail in FIGURE 9, the spring locking member 72 is fixedly secured at its upper end by a pin 75 inside tubular frame member 60. To release the locking member 72, it is merely necessary to apply finger pressure to the spring ends extending through the slots 73 and 74.

A pair of generally semicircular plates 76 and 77 provided with a plurality of detents 78 on their front edges thereof are pivotally connected to the upper portion of tubular frame member 60 by a pin 79. Threadably mounted adjacent the bottom edges of plates 76 and 77 are a pair of locking pins 82 and 83. As shown in detail in FIGURE 7, each locking pin comprises an enlarged knurled, circular handled end, a shaft partially flattened on one side, and a threaded end. By turning the pins, their shafts may be removed into or out of engagement with the detents 78 of plates 76 and 77 depending on the position of the flattened sides of the shafts.

Slidably mounted on a plate 84 secured to the upper edges of plates 76 and 77 is a basket 85. As shown in detail in FIGURE 8, an additional plate 86 is mounted on the bottom of basket 85 for cooperation with plate 84. The plates 84 and 86 are both bent along their side edges to form interfitting channels 87 and 88, respectively. Locking screws 89 are provided in plate 84 to prevent relative movement of the two plates 84 and 86 and thus keep the basket 85 from sliding longitudinally. With the basket secured against longitudinal movement, it may be angularly tilted to any one of a plurality of predetermined positions ranging from horizontal to vertical corresponding to the detents 78.

The basket 85 is provided with a pair of hinged side flaps 91 and 92 on its rear end wall 93. As shown by the dotted lines in FIGURE 10, side flaps 91 and 92 may be folded inwardly while end wall 93 including flaps 91 and 92 may be folded backwardly as shown in FIGURE 12. The front end wall 98 of basket 85 is tilted inwardly as shown in FIGURE 5. Crisscrossed straps or lacing 94 may be attached to the sides of the basket 85 to secure the contents of the basket therein as illustrated in FIGURE 10. These straps 94 are particularly useful for holding an infant in the basket 85. The position and arrangement of straps 94 may be altered as desired.

Attached to the rear portion of basket 85 is a handle 96 bent backwardly at its upper end to form a hook. As shown in FIGURE 12, the handle 96 may be folded back to engage a car seat or other support 97 when the carrier is in a collapsed position. Handle 96 also may be telescopically constructed thus permitting greater adjustment.

The entire carrier may be folded into a collapsed position as shown in FIGURE 12. To collapse the carrier, the spring locking member 72 is depressed to allow bracket 65 to slide upwardly on frame member 60. The carriage legs 52, 53, 54 and 55 are then folded upwardly until they are in a parallel relation with frame member 60. Basket 85 is thereafter tilted downwardly to a vertical position by turning locking screws 82 and 83 and allowing plates 76 and 77 to rotate freely.

Still another modified collapsible carrier according to the invention shown in FIGURES 13–20 of the drawings. This embodiment provides a mobile collapsible infant carrier which may be readily converted into an infant stroller with a minimum of effort. The carrier of this embodiment of the invention is very similar to the carrier disclosed in FIGURES 1–4 of the drawings.

The carrier of FIGURES 13–20 includes a generally rectangular supporting carriage 102 comprised of a generally U-shaped tubular member 103, having its free ends connected by a lateral tubular member 104. The carriage 102 is supported by wheels 105 mounted in swivel casters 106 adjacent each corner thereof.

Figure 18:
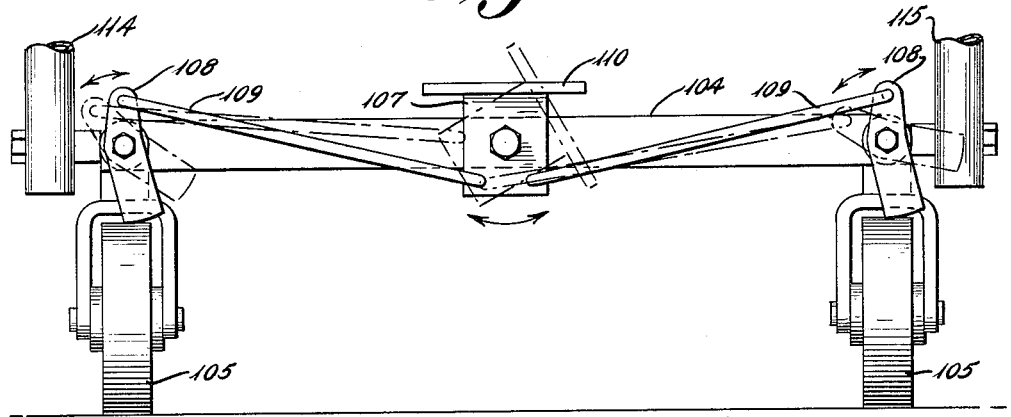
FIGURE 18 is an enlarged view showing the brake means associated with the rear wheels of the carriage of FIGURES 13–16.

The two rear wheels are provided with a braking means indicated generally by the numeral 107 and shown in detail in FIGURE 18. Although any satisfactory braking means may be employed with the carrier, the specific braking means shown in FIGURE 18 comprises a braking plate 108 pivotally mounted adjacent each end of lateral carriage member 104 and adapted to engage the surface of the rear wheels 105 when in a braking position. The braking plates 108 are pivotally operated by a pair of connecting rods 109 attached to an operating handle 110 rotatably mounted centrally of lateral carriage member 104. Rotation of handle 110 thus moves the braking plates 104 in and out of engagement with the rear wheels of the carriage to effect a braking action. This same type of braking mechanism also could be used on the carrier illustrated in FIGURES 1–4 of the drawings.

Pivotally mounted on the ends of lateral carriage member 104 is an upstanding frame member 113 comprised of a pair of legs 114 and 115 connected at the top by a lateral handle member 116. Handle member 116 may be curved backwardly for convenience in handling and to adapt it to engage a support such as a car seat when the carrier is in a collapsed position.

Figure 17:
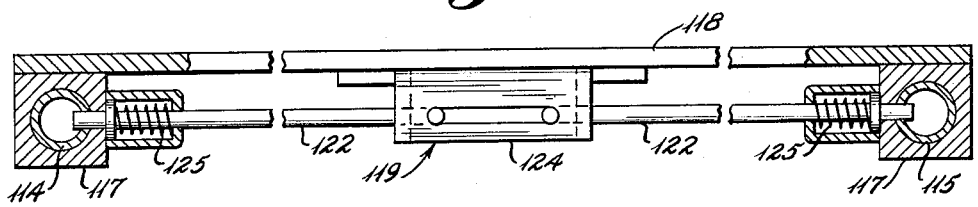
FIGURE 17 is an enlarged sectional view taken along line 17—17 of FIGURE 14 showing the locking device for holding the movable brackets on the upstanding frame member in place.

A pair of vertically movable brackets 117 connected on their back sides by a lateral brace 118 are mounted on the legs 114 and 115 of frame member 113 as best shown in FIGURES 14 and 17. Any suitable locking mechanism such as that shown generally at 119 may be employed to lock brackets 117 in position on frame member 113 when the carrier is in an erect position. Locking mechanism 119 comprises a pair of movable spring biased locking arms 122 having upturned or angularly bent end portions at their inner ends which serve as handles 123. The handle end portions 123 of arms 122 are supported centrally of brackets 117 by a generally U-shaped holder 124 rigidly attached to lateral brace 118. The outer ends of locking arms 122 are adapted to pass through apertures in the inner sides of brackets 117 to engage corresponding apertures provided in the legs 114 and 115, and thus lock the brackets 117 in place when the carrier is in an erect position. Each of the arms 122 is normally biased outwardly into locking position by a spring 125 mounted adjacent the outer end of the arm. To operate locking mechanism 119, handles 123 are squeezed together, thus slidably moving the outer ends of arms 122 out of engagement with the apertures in legs 114 and 115.

Carriage 102 and frame member 113 are connected by a pair of links 126 pivotally connected at one end to the sides of carriage member 103 and pivotally connected at the opposite end to lateral rod 127. Rod 127 extends between and is supported at its ends by the brackets 117.

Also pivotally mounted at one end on rod 127 is an adjustable folding brace 128 movable to a plurality of positions. Brace 128 is comprised of a pair of foldable arms 129, each arm 129 in turn being comprised of an inner link 130 and an outer link 131. Links 130 and 131 are pivotally connected at their inner ends on the ends of cross piece 134. As best shown in FIGURE 14 cross piece 134 extends between and connects arm 129 at the pivot connection point of each pair of inner and outer links. A second crosspiece 135 connects the outer ends of the two outer links 131. Each outer link 131 is also provided with a resilient clamp 136 on its outer end thereof.

Pivotally connected at one end to the legs 114 and 115 is an infant holding basket 140. Secured to the bottom of the front portion of basket 140 is a cross brace 141 having a downturned flange 142 on each end thereof. The flanges 142 are pivotally connected to legs 114 and 115 by any suitable means such as pins or bolts 143. A pair of plates 144 provided with detents 145 are fixedly mounted on opposite sides of basket 140 to receive crosspiece 134 of brace 128. Brace 128 thus serves as a support for basket 140. A lock arm 146 is removably attached centrally of the bottom of basket 140 to prevent brace 128 from falling when crosspiece 134 is disengaged from one of the detents 145. Lock arm 146 has a generally flattened U-shaped construction and is supported at its outer end by channel member 147 attached to basket 140 and at its inner end by a wing nut and bolt assembly 148. By engaging crosspiece 134 of brace 128 in any of the detents 148, the basket may be angularly tilted to any one of a plurality of predetermined positions as shown in FIGURE 13.

Figure 20:
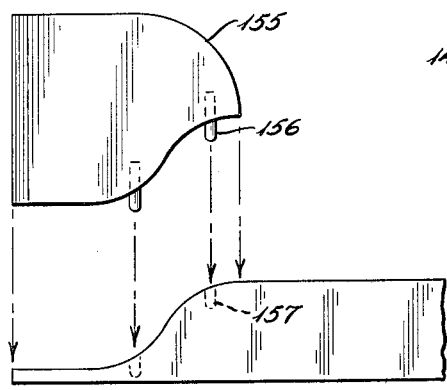
FIGURE 20 is an enlarged side elevation view of the rear portion of the basket of the carrier of FIGURE 13 showing the manner in which the rear end wall is removable from the basket.
Figure 19:
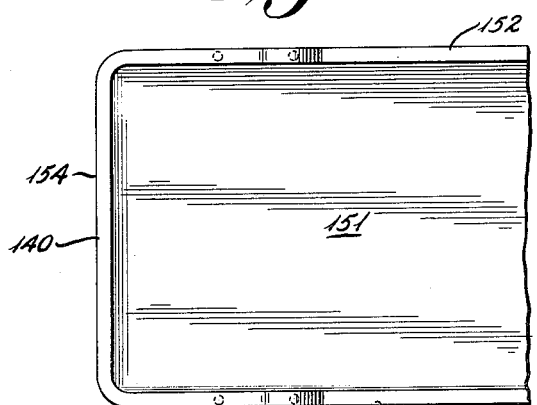
FIGURE 19 is an enlarged top plan view of the rear portion of the basket of the carrier of FIGURE 13.

Basket 140 may be comprised of a bottom 151, two sidewalls 152, a front end wall 153 and a removable back end wall 154 as best shown in FIGURES 13, 19 and 20. As can be seen from FIGURE 13, the sidewalls are of a greater height at the front end, a lesser height in the center portion, and an even more reduced height at the back end. Back end wall 154 is provided with a pair of integral side flaps 155 which are adapted to engage the lower back portion of side walls 152. End wall 154 is attached to the sidewalls 152 by means of pins 156 on side flaps 155 which engage slots or apertures 157 provided in side walls 152. The removable end wall permits the basket to accommodate various sized infants. When used to hold a larger infant, end wall 154 is simply removed. Basket 140 additionally may be provided with straps or belts similar to that shown in the baskets of the first two embodiments of the invention to hold an infant therein. Although basket 140 has been described for use with the carrier of FIGURES 13–20, it may also be used with the carriers of the other embodiments previously described.

A particularly useful and practical feature of the embodiment of FIGURES 13–20 is that which permits the carrier to be converted into an infant stroller as shown in FIGURES 13 and 15. As illustrated by the dotted lines of FIGURE 13, brace 128 may be disengaged from a first position where it supports basket 140 and adjusted to a second lower position to form support means for an auxiliary infant seat 160. In moving brace 128 to its second position, crosspiece 134 is disengaged from basket 140, the brace is pivoted to a generally horizontal position, and outer links 131 are pivoted outwardly and downwardly as shown by the arrows in FIGURE 13. When brace 128 is in its second position, the resilient clamps 136 on the ends of links 131 engage carriage member 103 to hold the brace in that position.

As shown in FIGURE 15, an auxiliary infant seat 160 may be attached to brace 128 when the brace is in its second position to convert the carrier into an infant stroller. Seat 160 may be constructed in any suitable manner. When the carrier is converted into a stroller, the basket 140 may be easily removed to provide greater convenience in using the stroller. In addition, any suitable footrest, indicated generally by the dotted lines 161 of FIGURE 13, may be provided on carriage 102. In the form shown in FIGURE 13, the footrest 161 is secured to carriage member 103 by means of resilient clamps 162.

The fact that the carrier of FIGURES 13-20 readily can be converted into an infant stroller is particularly advantageous in that it greatly increases the usefulness of the carrier by permitting it to be used for a much greater length of time.

The entire carrier may be folded into a collapsed position as shown in FIGURE 16. To collapse the carrier, brace 128 is disengaged from basket 140 and locking mechanism 119 is released to allow brackets 117 and the braces and rods attached thereto to slide upwardly on frame member 113. As the brackets 117 slide upwardly, carriage 102 is also pivoted upwardly until it is in a substantially parallel relation with frame member 113.

The collapsible carriers according to the invention preferably are constructed of a light, strong metal such as aluminum, although any other suitable material may be used. The baskets employed additionally may be constructed of a light, laminated plastic or other suitable material.

While the carrier of this invention has been described with particular reference for use as an infant carrier, it is not so limited and may be used for a variety of other purposes.

Moreover, while the invention has been described with reference to preferred specific embodiments, many other modifications may be made by persons skilled in the art without departing from the scope of the invention which is defined solely by the appended claims.

What is claimed is:

1. A collapsible carrier comprising a supporting carriage, a pair of upstanding frame members mounted on said carriage, a lateral frame member integrally connecting the upper portions of said upstanding frame members which serves as a handle for said carriage, a pair of vertically adjustable links connecting said upstanding frame members to said carriage, a basket pivotally connected to said upstanding frame members, and means for adjusting said basket to a plurality of predetermined vertically angular positions with respect to said frame members so that said basket may be locked in any one of said positions, said means comprising at least one plate provided with a plurality of detents secured to said basket and a cooperating locking member secured to each of said upstanding frame members.

2. A collapsible infant carrier comprising a supporting carriage, a plurality of wheels supporting said carriage, a pair of upstanding frame members mounted on said carriage, a lateral frame member integrally connecting the upper portions of said upstanding frame members which serves as a handle for said carriage, a pair of vertically adjustable links connecting said upstanding frame members to said carriage so that said carriage may be folded into parallel relation with said upstanding frame members, means for locking said links in place, a basket pivotally connected to said upstanding frame members, and means for adjusting said basket to a plurality of predetermined vertically angular positions with respect to said frame members so that said basket may be locked in any one of said positions, said means comprising a pair of plates provided with a plurality of detents fixedly secured to said basket and a pair of braces pivotally connected at one end to said upstanding frame members and adjustably connected at their opposite ends to said plates for cooperation with said detents.

3. A collapsible carrier comprising a supporting carriage, a pair of upstanding frame members mounted on said carriage, a lateral frame member integrally connecting the upper portions of said upstanding frame members which serves as a handle for said carriage, a pair of vertically adjustable links connecting said upstanding frame members to said carriage, a basket pivotally connected to said upstanding frame members, and means for adjusting said basket to a plurality of predetermined vertically angular positions with respect to said frame members so that said basket may be locked in any one of said positions, said means comprising at least one plate provided with a plurality of detents secured to said basket and a cooperating locking member secured to each of said upstanding frame members, said locking members together comprising an adjustable brace movable to a plurality of positions, said brace having a first position engaging and supporting said basket, said brace also having a second position forming support means for an auxiliary infant seat.

4. A collapsible infant carrier comprising a supporting carriage, a plurality of wheels supporting said carriage, a pair of upstanding frame members mounted on said carriage, a lateral frame member integrally connecting the upper portions of said upstanding frame members which serves as a handle for said carriage, a pair of vertically adjustable links connecting said upstanding frame members to said carriage so that said carriage may be folded into parallel relation with said upstanding frame members, means for locking said links in place, a basket pivotally connected to said upstanding frame members, and means for adjusting said basket to a plurality of predetermined vertically angular positions with respect to said frame members so that said basket may be locked in any one of said positions, said means comprising a pair of plates provided with a plurality of detents fixedly secured to said basket and an adjustable brace comprised of a pair of foldable links connected at one end to said upstanding frame members and movable to a plurality of positions, said brace having a first position engaging and supporting said basket, said brace also having a second position forming support means for an auxiliary infant seat.

References Cited by the Examiner

UNITED STATES PATENTS

| | | | |
|---|---|---|---|
| 1,955,209 | 4/34 | Tyler | 211—126 X |
| 2,422,862 | 6/47 | Stottrup | 296—20 X |
| 2,509,103 | 5/50 | Lewis et al. | 280—39 |
| 2,958,873 | 11/60 | Ferneau | 296—20 X |

ARTHUR L. LA POINT, *Primary Examiner.*